(12) United States Patent
Verbist et al.

(10) Patent No.: US 11,329,291 B2
(45) Date of Patent: May 10, 2022

(54) ELECTRIC ENERGY STORAGE DEVICE

(71) Applicant: SHELL OIL COMPANY, Houston, TX (US)

(72) Inventors: Guy Lode Magda Maria Verbist, Amsterdam (NL); Christina Georgieva Christova-Zdravkova, Eindhoven (NL); Alexey Deyko, Eindhoven (NL); Joice Sandra Klitzke, Eindhoven (NL); Indranil Rudra, Bengaluru (IN)

(73) Assignee: SHELL USA, INC., Houston, TX (US)

( * ) Notice: Subject to any disclaimer, the term of this patent is extended or adjusted under 35 U.S.C. 154(b) by 334 days.

(21) Appl. No.: 16/633,425

(22) PCT Filed: Jul. 23, 2018

(86) PCT No.: PCT/EP2018/069903
§ 371 (c)(1),
(2) Date: Jan. 23, 2020

(87) PCT Pub. No.: WO2019/020561
PCT Pub. Date: Jan. 31, 2019

(65) Prior Publication Data
US 2021/0135232 A1   May 6, 2021

(30) Foreign Application Priority Data

Jul. 25, 2017 (EP) .................................. 17183002

(51) Int. Cl.
| H01M 4/00 | (2006.01) |
| H01M 4/66 | (2006.01) |
| H01M 4/04 | (2006.01) |
| H01M 10/052 | (2010.01) |
| H01M 10/054 | (2010.01) |
| C07F 7/08 | (2006.01) |

(52) U.S. Cl.
CPC ......... *H01M 4/661* (2013.01); *H01M 4/0404* (2013.01); *H01M 10/052* (2013.01); *H01M 10/054* (2013.01); *C07F 7/0834* (2013.01)

(58) Field of Classification Search
CPC .... H01M 4/624; H01M 4/137; H01M 10/052; H01M 2004/028; H01M 4/0404; Y02E 60/10
See application file for complete search history.

(56) References Cited

U.S. PATENT DOCUMENTS

| 8,308,971 B1 | 11/2012 | Bhat et al. |
| 8,703,344 B2 | 4/2014 | Bhat et al. |
| 9,647,272 B1 | 5/2017 | Cheng et al. |
| 9,876,211 B2 | 1/2018 | Son et al. |
| 9,979,008 B2 | 5/2018 | Dai et al. |

FOREIGN PATENT DOCUMENTS

| CN | 100364151 C | 1/2008 |
| EP | 2610228 A1 | 7/2013 |
| EP | 2924784 A1 | 9/2015 |
| KR | 101717209 B1 | 3/2017 |
| WO | 2007065920 A2 | 6/2007 |
| WO | 2008148814 A2 | 12/2008 |
| WO | 2008152054 A1 | 12/2008 |
| WO | 2010012601 A1 | 2/2010 |

OTHER PUBLICATIONS

International Search Report and Written Opinion received for PCT Patent Application No. PCT/EP2018/069903, dated Sep. 11, 2018, 09 pages.
Manthiram et al., "Rechargeable Lithium-Sulfur Batteries", Chem. Rev., vol. 114, Issue No. 23, Jul. 15, 2014, pp. 11751-11787.
Wei et al., "A Stable Room-temperature Sodium-sulfur Battery", Nature Communications 7, Article No. 117222, Jun. 9, 2016, [doi 10.1038/ncomms11722], 10 pages.
Patel et al., "Li—S Battery Analyzed by UV/Vis in Operando Mode", ChemSusChem, vol. 6, Issue No. 7, Jul. 2013, pp. 1177-1181.
Office Action Received for IN Application No. 202047007240, dated Mar. 10, 2022, 07 Pages of English Translation.

*Primary Examiner* — Cynthia H Kelly
*Assistant Examiner* — Monique M Wills
(74) *Attorney, Agent, or Firm* — Shell USA, Inc.

(57) ABSTRACT

The present invention provides an electric energy storage device, in particular a battery, at least comprising: —an anode comprising an alkali metal selected from lithium and sodium or a combination thereof; —a cathode comprising a sulphur-containing organosilane compound or a mixture of sulphur-containing organosilane compounds; and—an electrolyte placed between the anode and the cathode; wherein the cathode comprises a current collector surface that has been at least partly modified by grafting the sulphur-containing organosilane compound or a mixture of sulphur-containing organosilane compounds thereon.

18 Claims, 2 Drawing Sheets

Fig. 1. $^1$H-NMR spectra taken at different times during Example 14 (MPTES + $^0$Li in THF-$d_8$)

Fig 2. $^1$H-NMR spectra taken at different times during Example 15 (TESPD + $^0$Li in THF-$d_8$).

Fig 3. $^1$H NMR spectra taken at different times during Example 16 (TESPT + $^0$Li in THF-$d_8$).

Fig. 4. $^1$H-NMR spectra taken at different times during Example 17 (TESPT + $^0$Na in THF-$d_8$).

ELECTRIC ENERGY STORAGE DEVICE

CROSS REFERENCE TO RELATED APPLICATIONS

This is a national stage application of International Application No. PCT/EP2018/069903, filed 23 Jul. 2018, and claims benefit of European Application No. 17183002.9, filed 25 Jul. 2017.

BACKGROUND

The present invention relates to an electric energy storage device, in particular a battery.

Various electric energy storage devices such as lithium-sulphur and sodium-sulphur batteries are known in the art.

A recent article by A. Manthiram et al. ("*Rechargeable Lithium-Sulfur batteries*", Chem. Rev. 2014, 114, pages 11751-11787) explains the principles of Li—S batteries, as well as the historical development and technical challenges. Important technical challenges of current Li—S batteries are inter alia: the formation of unwanted, long polysulphides that are soluble in common liquid electrolytes (which can cause the loss of sulphur as a cathode material over time and thus decreases the battery capacity and life-time, the so-called 'shuttle effect'); density differences between the reactants, lithium and sulphur and di-lithiumsulphide (the final reaction product); and poor conductivity of elemental sulphur.

Until recently, sodium-sulphur batteries required elevated temperatures for the operation thereof. Wei et al. (Nature Communications 7, Article number 11722 (2016) [doi 10.1038/ncomms11722] have shown that Na—S operation at room temperature is possible. However, this requires a specially prepared sulphur cathode material in which the sulphur is contained in nanoporous material, which is expensive and requires a complicated preparation process to achieve.

It is an object of the present invention to overcome or minimize one or more of the above problems.

It is a further object of the present invention to provide an alternative electric energy storage device (in particular a lithium-sulphur or sodium-sulphur battery) and an alternative cathode for use therein.

SUMMARY

One or more of the above or other objects can be achieved by providing an electric energy storage device, in particular a battery, at least comprising:

an anode comprising an alkali metal selected from lithium and sodium or a combination thereof;

a cathode comprising a sulphur-containing organosilane compound or a mixture of sulphur-containing organosilane compounds; and an electrolyte placed between the anode and the cathode.

DETAILED DESCRIPTION

It has surprisingly been found according to the present invention that the formation of unwanted, long polysulphides (e.g. containing 4 or more sulphur atoms) in the electrolyte can be reduced or even avoided. Without wanting to be bound by a specific theory, it is believed that the formation of such long polysulphides in the electrolyte is reduced or even avoided because the sulphur-containing organosilane compounds can react with lithium or sodium from the anode without creating long polysulphides. The reduction or avoidance of the formation of these long polysulphides reduces the above-mentioned 'shuttle effect'.

Also, again without wanting to be bound by a specific theory, it is believed that the silane functionality allows chemical bonding directly to the metal of the current collector of the cathode or conductivity improvers (if any) or indirectly by formation of an oligomerized network. This network may allow flexibility that can mitigate the volume changes when reaction takes place between the sulphur contained in the sulphur-containing organosilane compounds and lithium or sodium.

The person skilled in the art will readily understand that the type of electric energy storage device can vary broadly and may include batteries and supercapacitors. Preferably, the electric energy storage device is a battery, in particular a lithium-sulphur or a sodium-sulphur battery.

As mentioned above, according to the present invention, the anode comprises an alkali metal selected from lithium and sodium or a combination thereof. The person skilled in the art will readily understand that the anode is not particularly limited, provided it comprises lithium and/or sodium. As the person skilled in the art is familiar with selecting the anode of Li—S and Na—S batteries, this is not further discussed here in detail. Preferably, the anode comprises only lithium or sodium as the alkali metal (hence not a combination of lithium and sodium), preferably only lithium.

The person skilled in the art will readily understand that the cathode is not particularly limited and may be varied broadly. As the person skilled in the art is familiar with selecting the cathode of Li—S and Na—S batteries, this is not further discussed here in full detail. As mentioned above, according to the present invention, the cathode comprises a sulphur-containing organosilane compound or a mixture thereof (i.e. a mixture of sulphur-containing organosilane compounds).

Preferably, the cathode comprises a current collector surface that has been at least partly, preferably wholly, modified by grafting the sulphur-containing organosilane compound thereon.

The advantage of chemically grafting of the sulphur-containing organosilane compound onto the current collector is that it allows for a ready contact of the contained sulphur with the current collector of the cathode (or the conductivity improver discussed below). The grafted organosilane forms a thin layer (or flexible oligomeric network) on the surface of the current collector (or the conductivity improver discussed below) which is not as brittle as elemental sulphur. As a consequence, the crack-induced material degradation and related loss of electrical conductance are reduced upon reacting lithium or sodium with the sulphur contained in the sulphur-containing organosilane.

As the person skilled in the art is familiar with selecting the current collector, this is not further discussed here in detail. Typically, the current collector has a resistivity ($\rho$) of at most 10 $\Omega \cdot$m, preferably at most 1 $\Omega \cdot$m. Usually, the current collector comprises metal, functionalized carbon, etc. According to the present invention it is particularly preferred that the current collector is comprised of a material that allows for grafting of sulphur-containing organosilane compounds (preferably via hydroxyl or alkoxy groups of the sulphur-containing organosilane compounds, if any). Preferably, the current collector comprises aluminium. Even more preferably, at least 80 wt. % of the current collector is comprised of aluminium.

Furthermore, it is preferred that the cathode comprises one or more conductivity improvers, preferably selected from the group consisting of metal particles, carbon particles or a combination thereof. Suitable examples of metal particles are aluminium, copper, silver and titanium particles, preferably aluminium particles. Suitable examples of carbon particles are graphite, soot, carbon black, carbon fibers, carbon nanotubes, graphene. Other suitable conductivity improvers are silica particles.

The person skilled in the art will readily understand that the grafting of the sulphur-containing organosilane compound on the current collector surface of the cathode can be achieved in various ways. As the person skilled in the art is familiar with grafting, this is not described here in much detail. Typically, the grafting according to the present invention results in the attachment of the sulphur-containing organosilane compound to the current collector surface of the cathode by establishing one or more chemical bonds via the silane groups directly onto the current collector surface or onto already attached organosilane. Typically, the grafting according to the present invention comprises the steps of cleaning the surface of the current collector of the cathode, applying the sulphur-containing organosilane compound (either pure or via a solvent) onto the current collector surface and allowing a reaction to establish a chemical bonding between the silane and the current collector surface.

The person skilled in the art readily understand that the nature of the sulphur-containing organosilane compounds may vary widely and is not particularly limited. Organosilanes are compounds having at least one carbon-silicon bond.

According to a preferred embodiment according to the present invention, the sulphur-containing organosilane compound has the general molecular formula (I):

wherein $R^1$, $R^2$ and $R^3$ are independently selected from $C_{1-12}$ alkoxy, acyloxy, aryloxy, alkyl, aryl, hydroxyl (OH) and halogen groups;
wherein $R^4$ is independently selected from a divalent hydrocarbon, preferably a $C_{1-18}$ alkylene or arylene;
wherein n is independently selected from an integer from 1 to 10;
wherein $R^5$ is selected from a divalent $C_{2-8}$ hydrocarbon, preferably alkylene or arylene; and
wherein p is independently selected from an integer including zero (0).

As mentioned above, $R^1$, $R^2$ and $R^3$ are independently selected from $C_{1-12}$ alkoxy, acyloxy, aryloxy, alkyl, aryl, hydroxyl (OH) and halogen groups. Preferably, the $C_{1-12}$ alkoxy, acyloxy, aryloxy, alkyl, aryl groups are $C_{1-6}$ groups (and in case not an aryl or aryloxy group: more preferably $C_{1-5}$ groups, even more preferably $C_{1-2}$ groups).

Preferably, $R^1$, $R^2$ and $R^3$ are independently selected from alkoxy and hydroxyl groups. It is particularly preferred that $R^1$, $R^2$ and $R^3$ are independently selected from ethoxy and hydroxyl groups.

As mentioned above, $R^4$ is independently selected from a divalent hydrocarbon, preferably $C_{1-18}$ alkylene or arylene group. More preferably, $R^4$ is independently selected from a $C_{1-10}$ alkylene, even more preferably a $C_{1-6}$ alkylene, yet even more preferably a $C_{1-3}$ alkylene group.

As mentioned above, n is independently selected from an integer from 1 to 10. Preferably, n is independently selected from an integer from 2 to 8, more preferably from 2 to 4.

As mentioned above, $R^5$ is selected from a divalent $C_{2-8}$ alkylene and arylene. Preferably, $R^5$ is selected from a divalent $C_{2-6}$ alkylene and arylene.

Preferably, p is selected from an integer from 0 to 20, more preferably at most 10, more preferably at most 6. Even more preferably p is 0.

According to an especially preferred embodiment of the present invention, the sulphur-containing organosilane compound having the general molecular formula (I) is a bis(3-triethoxysilylpropyl)polysulphide. The 'poly' in bis(3-triethoxysilylpropyl)polysulphide typically has a value from 2 to 8, and the average is preferably about 2 or about 4. The person skilled in the art knows that commercially available compounds of this type (such as trade names Si69 and Si75 from Evonik Industries AG (Essen, Germany) may contain mixtures of varying sulphur-bridge length. According to the present invention there is a preference for using bis(3-triethoxysilylpropyl)tetrasulphide [TESPT] and bis(3-triethoxysilylpropyl)disulphide [TESPD] (in formula I: $R^1$/$R^2$/$R^3$=ethoxy, $R^4$=propylene, p=0) either in pure form or in mixtures with other polysulphides of this kind with a different sulphur-bridge length.

As already mentioned above, but emphasized for the sake of clarity, the cathode may comprise one sulphur-containing organosilane compound or a mixture of sulphur-containing organosilane compounds.

As mentioned above, according to the present invention, the electric energy storage device comprises an electrolyte between the anode and the cathode. The person skilled in the art will readily understand that the electrolyte can be varied widely and is not particularly limited. Suitable examples of electrolytes are disclosed in the above-mentioned article by Manthiram et al.

In another aspect, the present invention provides the cathode as defined in the device according to the present invention.

In an even further aspect, the present invention provides a method for preparing a cathode suitable for use in the device according to the present invention, the method at least comprising the steps of:
(a) selecting a cathode having a current collector surface;
(b) providing a sulphur-containing organosilane compound; and
(c) grafting the sulphur-containing organosilane compound on the current collector surface of the cathode thereby obtaining a cathode having an at least partly modified current collector surface.

As mentioned above, as the person skilled in the art is familiar with grafting, this is not described here in further detail. If desired, the at least partly modified current collector surface can be dried at elevated temperatures or by using a vacuum oven to remove or reduce any residual solvent used and/or moisture content. Typical drying temperatures are from 60-100° C. Applied vacuum is typically in the order of $10^{-2}$ mbar.

Hereinafter the invention will be further illustrated by the following non-limiting examples.

EXAMPLES

Examples 1-13

Cathode Preparation by Grafting

Various experiments (Examples 1-13) were performed to provide (by grafting) a sulphur-containing organosilane compound on aluminium foil (thickness of 0.03 mm) and aluminium substrate (thickness of 0.5 mm). In certain cases (Examples 10 and 11), a glass substrate was used by exception. The aluminium foils and substrate are exemplary for materials that can be used as a current collector of a cathode in a battery; the person skilled in the art would readily understand how to produce a battery whilst using the grafted current collector as prepared in these examples in a cathode.

The aluminium foils and substrates were first cleaned with heptane and ethanol in order to remove any surface contamination.

In all Examples 1-13, commercially available samples of TESPT from ABCR GmbH (Karlsruhe, Germany) and TESPD (trade name Si75) from Evonik Industries AG (Essen, Germany) were used.

In Examples 1-3 a few drops of respectively 10, 20 and 30 wt. % TESPT solution in ethanol were placed on separate (15.0×8.0×0.03 mm) Al foils and then carefully spread over the surface to form thin films.

Then the foils were placed for 48 hours in an oven at 90° C. to graft the TESPT on the Al foils. Finally, the Al foils grafted with TESPT were rinsed with ethanol to remove non-reacted TESPT molecules and dried in a desiccator for 48 hours.

In Example 4, a few drops of pure TESPT were placed on and spread over an (10.0×8.0×0.03 mm) Al foil. Then, a few drops of distilled water were placed on top of the TESPT-wetted foil. Next, the foil was placed for 48 hours in an oven at 90° C. Finally, the Al foil was rinsed with ethanol and dried in a desiccator for 48 hours.

In Example 5, approximately 0.5 ml of pure TESPT was spread over an Al substrate (30×30×0.5 mm) and then spin coated [RC8 spin coater, Karl Suss (Garching, Germany)] with following settings: 1000 rpm, 15 sec., 5 rpm/s. The drying procedure was as follows: 90° C. for 72 hours; then cover the film with a layer of $H_2O$ and dry at 60° C. for 72 hours; finally, dry under vacuum at 60° C. for 24 hours. The final film was not washed with ethanol.

In Example 6, approximately 0.5 ml of pure TESPT was spread over an Al substrate (30×30×0.5 mm) and then spin coated [RC8 spin coater] with following settings 500 rpm, 15 sec., 5 rpm/s. The lower spin coating speed allowed to generate a thicker organosilane film. The drying procedure was as follows: add several drops of $H_2O$ around the glass substrate and dry at 70° C. for 48 hours; then cover the film completely with a layer of $H_2O$ and dry at 60° C. for 72 hours. The final film was not washed with ethanol.

In Example 7, pure TESPT was pre-hydrolysed by mixing it with a solution of isopropyl alcohol (IPA: obtained from Sigma-Aldrich) and demineralized water. The weight % ratios between TESPT:IPA:$H_2O$ were 70:15:15. The mixture was heated to 70° C. and stirred for 1 hour. Then approximately 0.5 ml of the mixture was spread over an Al substrate (30×30×0.5 mm) and spin coated using the same [RC8] spin coater with the following settings: 1000 rpm, 15 sec., 5 rpm/s. The film was dried at 100° C. under vacuum for 24 hours. The final film was not washed with ethanol.

Example 8 was prepared in the same way as Example 7, except different spin coating settings were used (500 rpm, 15 sec., 5 acceleration rpm/s) in order to generate a thicker organosilane film. The film was dried at 100° C. under vacuum for 48 hours. The final film was not washed with ethanol.

Example 9 was used to check for the possibility of grafting TESPT with a conductive agent. Carbon Black Super P conductive (H30253; obtained from Alfa Aesar (Karlsruhe, Germany)) was mixed with an excess of chloroform (obtained from Sigma Aldrich), ultra-sonicated in Branson 5510, Emerson (St. Louis, United States) for 3 hours at room temperature, then mixed with pure TESPT. The weight % ratio between TESPT and CB was 90:10. This mixture containing TESPT and CB was then ultra-sonicated for 0.5 hour and spin coated [RC8] on an Al substrate (30×30×0.5 mm) with following settings: 1500 rpm, 30 sec., 5 rpm/s. The film was dried as follows: 60° C. for 48 hours and few drops of $H_2O$ on top of the film to improve the hydrolysation of TESPT, followed by 90° C. for 48 hours under vacuum. The final film was not washed with ethanol.

Example 10 was used to measure the conductivity of pure TESPT film, that was spin coated on a non-conductive glass substrate (49×49×1 mm) with the following settings: 1000 rpm, 15 sec., 5 rpm/s. The drying conditions were: 70° C. for 96 hours with several drops of $H_2O$ around the substrate to improve the hydrolysation, then 90° C. 24 hours under vacuum. The final film was not washed with ethanol.

Example 11 was used to measure the conductivity of a film consisting of TESPT mixed with a conductivity improver, in this case Carbon Black (Super P conductive, H30253 from Alfa Aesar). The TESPT/CB mixture was prepared in the same was as in Example 9. The organosilane film was spread over a non-conductive glass substrate (49×49×1 mm) using another clean glass slide. The drying conditions were the same as in Example 10. The final film was not washed with ethanol.

In Example 12, approximately 0.5 ml of pure TESPD was spread over an Al substrate (30×30×0.5 mm) and then spin coated with the following settings: 1000 rpm, 15 sec., 5 rpm/s. The film was dried at 100° C. under vacuum for 24 hours. The final film was not washed with ethanol.

In Example 13, approximately 0.5 ml of pure TESPD was spread over an Al substrate (30×30×0.5 mm) and then spin coated with following settings 500 rpm, 15 sec., 5 rpm/s. The film was dried at 100° C. under vacuum for 48 hours. The final film was not washed with ethanol.

Film Thickness

The film thickness of the grafted organosilane compound on the substrate of Example 5 was determined using an optical interferometer (Zoomsurf 3D, Fogale Nanotech (Nimes, France)) using white light and magnification of 20.

The film thickness of the grafted organosilane compound on the substrate of Examples 6-13 was determined using a contact profilometer (model Dektak XT obtained from Bruker (Leiderdorp, the Netherlands). Measurement settings: 0.25 µm resolution, 1000 µm length, stylus force 3 mg.

The measured film thicknesses are given in Table 1 below.

TABLE 1

| Example | Film Thickness [µm] | Substrate |
| --- | --- | --- |
| 5 | 5 ± 1 | Al |
| 6 | 11 ± 2 | Al |

TABLE 1-continued

| Example | Film Thickness [µm] | Substrate |
|---|---|---|
| 7 | 8 ± 2 | Al |
| 8 | 10 ± 2 | Al |
| 9 | 7 ± 5 | Al |
| 10* | 0.07 ± 0.02 | glass |
| 11* | 10 ± 5 | glass |
| 12 | 11 ± 3 | Al |
| 13 | 10 ± 3 | Al |

*Examples 10 and 11 are not according to the present invention (glass is not a suitable current collector material), but have been included for the conductivity test as mentioned below to further illustrate the present invention.

Examples 1-9, 12 and 13 show that by grafting a sulphur-containing organosilane compound onto aluminium (a typical material used as a current collector of an electrode) allows to create a film of sulphur-containing organosilane on the aluminium. As the observed thicknesses are in the micrometer range, this suggests that an oligomer network is formed (rather than just a thin molecular layer).

FT-IR Snalysis

FT-IR was performed on Examples 1-4 and showed the presence of $CH_2$—, Si—O—Si— and Si—O—C bonds, clearly indicating that the silane group has undergone a chemical reaction on the aluminium substrate.

XPS Analysis

XPS (X-ray photoelectron spectroscopy) was used to investigate the grafting of organosilanes to the above Al foils and substrates of Examples 1-7, 9 and 12. XPS was performed on the bare foils and substrates and after the grafting process had taken place using a spectrophotometer from Thermo Fisher Scientific (Landsmeer, the Netherlands). The settings were: wide scans—pass energy of 200 eV, 0.1 eV step size; high resolution scans—50 eV pass energy, 0.1 eV step size.

XPS clearly demonstrated the appearance of Si and S signals on the surface of the Al foils and substrates after the organosilanes were grafted thereon.

As the XPS characterization was performed at ultrahigh vacuum conditions (allowing all non-grafted material to evaporate), it was concluded that a durable grafting of the organosilanes on the Al current collector has been established.

Conductivity

The conductivity was measured for Examples 10 and 11 (with glass as substrate, as Al substrates would result in short-circuiting) using a four-point probe method (operated in DC mode) using a Keithley 6517A electrometer and a Keithley 237 high voltage source measure unit.

Carbon electrodes (obtained from Electron Microscopy Sciences (Hatfield Pa., United States)) were applied on the surface of Example 10 in order to ensure a good contact and define the measurement geometry. The length of the carbon electrodes was 5 mm and the spacing between them was 5 mm. No conductivity was measured for Example 10, and for Example 11 the conductivity was 5 $Sm^{-1}$.

These measurements showed that a good conductivity is possible to achieve in grafted films consisting of organosilane and carbon black as conductivity improver.

Electrochemistry

Electrochemical measurements were performed in a 3-electrode cylindrical cell with an effective surface area of 2 $cm^2$. The cell was made from Teflon with a volume of about 15 ml. The cells were assembled in an argon-filled glove box. Cyclic voltammetry (CV) curves were recorded using an Autolab potentiostat as obtained from Metrohm Autolab B.V. (Utrecht, Netherlands). Pure Li metal was used as an anode and reference electrode; the electrolyte was a 1:1 mixture (by volume) of DOL:DME (obtained from Aldrich) with 1 wt. % $LiNO_3$ and 1 M of LiTFSI (obtained from Aldrich). Cyclic voltammetry (CV) measurements were done on Example 5, in the range 1-3V with a step of 0.001V.

The CV curve collected for the sample in Example 5 showed an electrochemical activity of the S-containing cathode material in the oxidation cycle in the form a broad anodic peak at 2.3-2.5 eV, which is typical for Li—S batteries.

Example 14-17

Cathodic Activity as Determined by NMR and Visual Inspection

In order to assess the cathodic activity (i.e. the conversion of lithium (or sodium) and sulphur from the sulphur-containing organosilane), lithium (or sodium) was contacted with the sulphur-containing organosilane in solution and the progress of the conversion reaction was monitored by both visual observation and NMR measurement.

The following sulphur-containing organosilane compounds were used:

TESPT, 95% pure (ABCR GmbH, Germany);

TESPT (Evonik Industries, Germany) with S content 22.5% Average S=3.7 per molecule; S2=18.3%, S3=30.6%, S4=24.0%, S5 to S8=26.4%; By-products 0.4%.

TESPD (Evonik Industries, Germany) with S content 15.5%; Average S=2.4 per molecule; S2=75.0%, S3=15.9%, S4=4.7%, S5 to S8=4.3%; By-products 0.6%.

MPTES, >94% pure (Alfa Aesar).

Please note that the ABCR TESPT was used for the Li experiments and the Evonik TESPT for the Na experiments.

Between 30 and 50 mg of the sulphur-containing organosilane compounds were dissolved into 0.7 ml deuterated THF (THF-$d_8$).

As substrates, between 3-30 mg Li and Na metal pieces were used.

The 4 experiments were conducted at ambient conditions (i.e. room temperature and atmospheric pressure) under Argon atmosphere:

Example 14: 50 mg MPTES in THF-d8 was mixed with 9 mg Li metal piece (molar ratio MPTES:Li=1:6) and the reaction was followed over a few days.

Example 15: 30 mg TESPD in THF-d8 was mixed with 3 mg Li metal piece (molar ratio TESPD:Li=1:6) and the reaction was followed over a few days.

Example 16: 40 mg TESPT in THF-d8 was mixed with 3 mg Li metal piece (molar ratio TESPT:Li=1:6, after 3 days extra Li was added to have total ratio TESPT:Li=1:13) and the reaction was followed over a few days.

Example 17: 40 mg TESPT in THF-d8 was mixed with 25 mg Na metal piece (molar ratio TESPT:Na=1:15) and the reaction was followed over a few days.

For the $^1$H-NMR measurement a Bruker spectrometer was used, at a resonance frequency of 400 MHz. The number of recorded scans was 32. Chemical shifts are reported in ppm relative to the residual peaks of THF-d8. The NMR spectra are shown in FIGS. 1-4.

Example 14

Visual

The solution of MPTES in THF-d8, in the presence of Li metal, was colorless and stayed like that throughout the duration of the experiment. Gas bubbles were observed to form at the interface between the Li metal piece and the solution; possibly hydrogen gas formed upon reaction of the mercaptosilane and Li.

In addition, no precipitate or sediment was observed that would be indicative of the formation of insoluble $Li_2S$. Also, as no coloration was observed, it was assumed to be unlikely that long polysulphides were formed.

NMR

Figure 1:
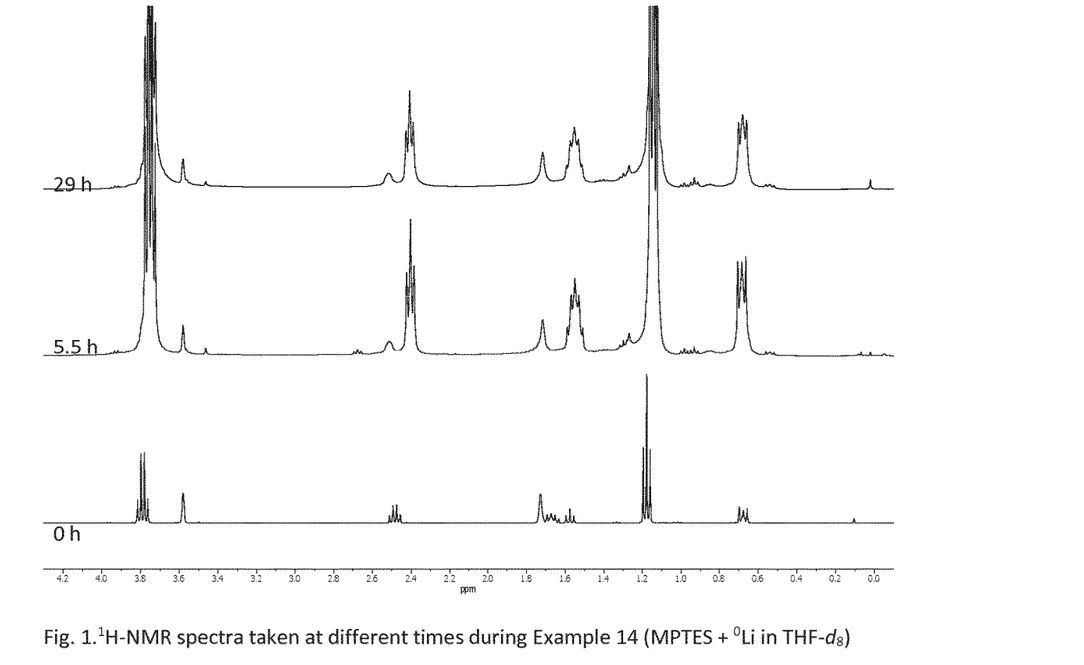
FIG. 1 shows $^1$H-NMR spectra according to an Example implementation of the disclosed subject matter.

The MPTES sample contained species having a S—H bond (($CH_3CH_2O)_3$—Si—$CH_2CH_2CH_2$—S—H). The NMR spectrum 5.5 h after the start of the experiment showed disappearance of the peaks associated with the S—H (~1.6 ppm) and $CH_2$—S—H (2.5 ppm) bonds of the mercaptosilane and appearance of peaks associated with $CH_2$—S—Li bond (2.4 ppm). This indicates that the S—H bond is replaced by an S—Li bond in the silane. This is consistent with the visual observation of gas bubble formation.

1 day later, the NMR spectrum remained virtually unchanged. From this experiment it was concluded: no evidence was found about removing the S atoms from the MPTES molecule and/or the formation of $CH_2$—Li bond. This is consistent with the absence of sediment in the visual experiment.

Example 15

Visual

The solution of TESPD in THF-d8, in the presence of Li metal, was initially very light yellow in color and the color stayed the same during the next 5 days without visible change. No solid sediment was observed at the bottom of the tube during the experiment. These observations indicate no formation of Li-polysulphides.

NMR

Figure 2:
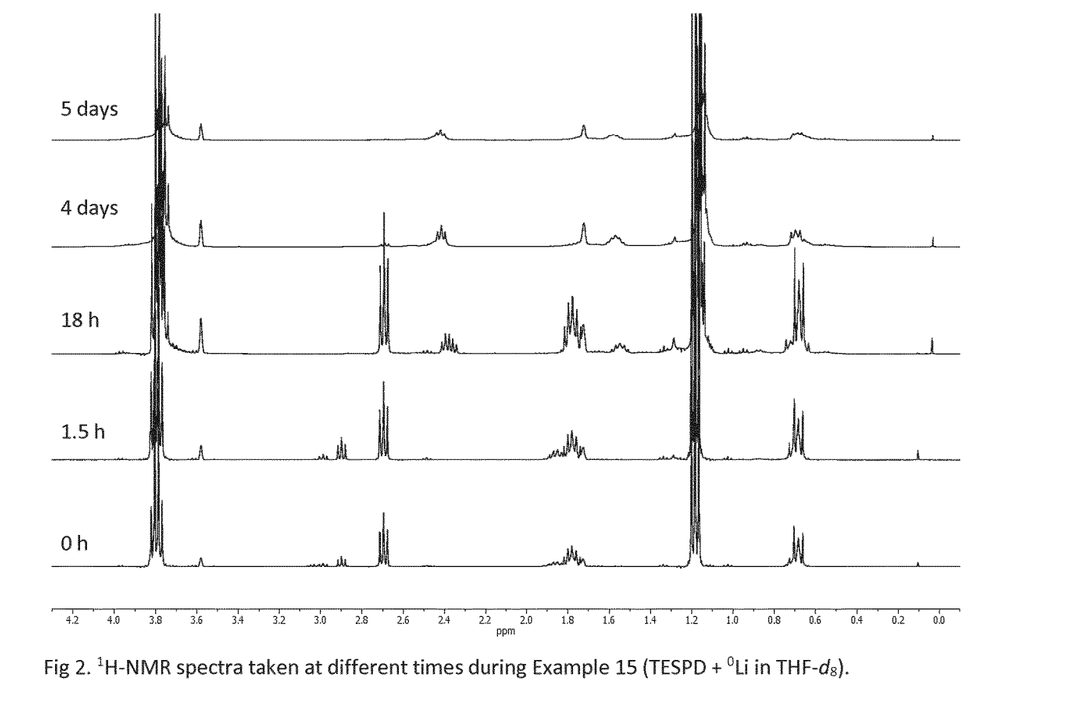
FIG. 2 shows $^1$H-NMR spectra according to an Example implementation of the disclosed subject matter.

The TESPD sample contained molecules with sulphur content between 2 and 8, the average being 2. The NMR spectrum taken 1.5 h after the start of the experiment was almost identical to the NMR spectrum of TESPD before bringing it in contact with Li metal, suggesting that the reaction between Li and TESPD had not started or progressed far yet. However, the NMR spectrum taken 18 h after the start of the experiment showed disappearance of the peaks associated with the presence of 3 or more S atoms per molecule (NMR chemical shifts at 2.9 ppm, 3.0 ppm), while the peaks corresponding to 2 S atoms per molecule (2.7 ppm) were still present. Next to that, a new set of peaks appeared, corresponding to $CH_2$—S—Li bond (~2.4 ppm) a value which is recognized from the NMR part of Example 14. These results indicated that the species containing 3 or more S atoms have reduced their S atoms to 2 per molecule, either with 2 S atoms in the 'bridge' or even that the bridge had split in two parts, each part ending with a $CH_2$—S—Li bond. The extra S atoms have probably formed short chain Li-polysulphides, as the color changes associated with large polysulphides were not observed. 4 days after the start of the experiments, a further progression of this mechanism had probably taken place as the NMR spectrum showed that the peaks corresponding to 2 S atoms per molecule (2.7 ppm) had almost disappeared too, and the CH2-S—Li peaks (2.4 ppm) were getting more pronounced. This indicates that almost all of the TESPD molecules had split in two parts due to the reaction with Li metal, each part ending with $CH_2$—S—Li bond. One day later, the NMR spectrum showed complete disappearance of the peaks corresponding to 2 S atoms in a molecule (2.7 ppm) and further growth of the $CH_2$—S—Li peaks (2.4 ppm). No evidence was found in the NMR spectra in this experiment that all of the S atoms were removed from the TESPD molecule, and/or that the formation of $CH_2$—Li bond occurred. This was consistent with the visual and NMR experiments of Example 14.

Example 16

Visual

Initially the solution of TESPT in THF-d8, with the metal Li added to it, was colorless to slightly yellowish. After 3 h the solution turned into bright orange color, indicative of formation of Li-polysulphides (see also: Patel, M. U. M.; Demir-Cakan, R.; Morcrette, M.; Tarascon, J.-M.; Gaberscek, M.; Dominko, R. Chem. Sus. Chem. 2013, 6, 1177).

After 44 h, the color of the solution was dark orange and a solid sediment was observed at the bottom of the tube. The Li metal piece was smaller in size. An additional piece of Li metal was added to the solution (such as to have the total molar ratio TESPT:Li=1:13). One day later, the color of the solution started to become lighter orange and 8 days after the start of the experiment, the solution was light orange to yellow in color. In addition to that, the amount of sediment at the bottom of the tube was increased. The discoloration of the solution was indicative of the transformation of the longer polysulphides to shorter polysulphides and insoluble $Li_2S$, therefore assumed to be the sediment.

NMR

Figure 3:
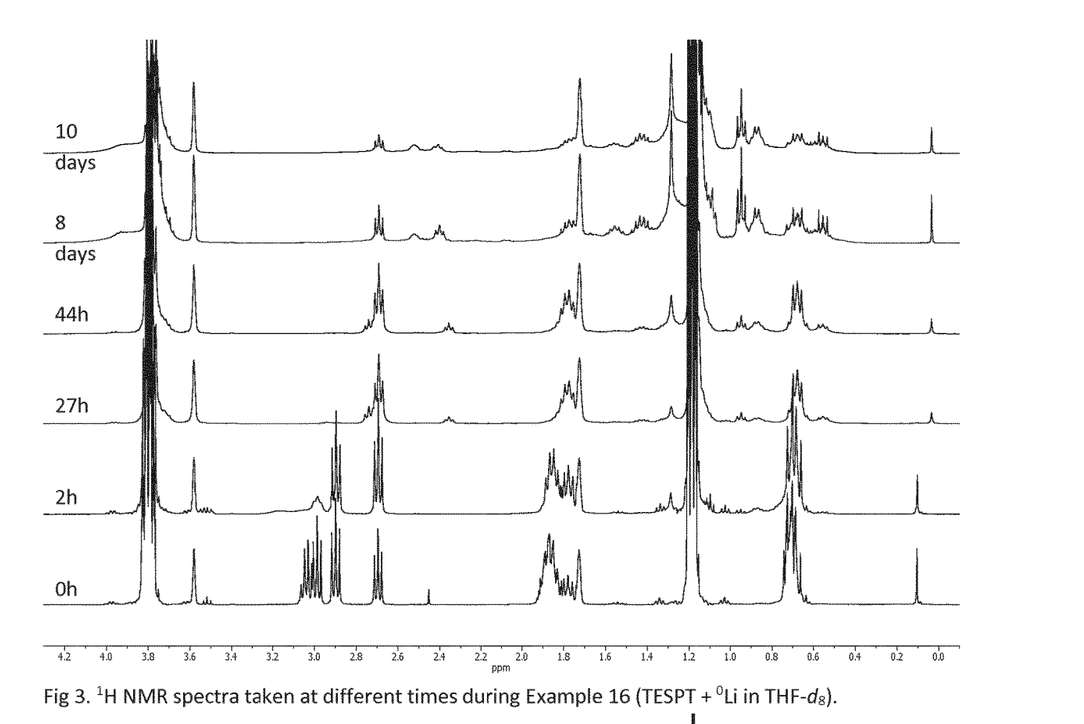
FIG. 3 shows $^1$H-NMR spectra according to an Example implementation of the disclosed subject matter.

The TESPT sample contained molecules with sulphur content between 2 and 8, the average being 4. The $^1$H-NMR spectrum taken after the first 2 h of the experiment showed a decrease of the peaks corresponding to 4 or more sulphur atoms per molecule (chemical shift at 3.0 to 3.1 ppm). This indicated that sulphur was quickly taken out of the molecules containing initially 4 to 8 sulphur atoms. The $^1$H-NMR spectrum taken 27 h after the start of the experiment showed complete disappearing of the peaks corresponding to 3-8 sulphur atoms per molecule (2.8 to 3.1 ppm); only peaks corresponding to 2 sulphur atoms per silane molecule were left (~2.7 ppm). As time progressed, a new set of peaks emerged (~2.4 ppm), indicating that besides reducing the number of sulphur atoms from the silane molecules containing 4 to 8 sulphur atoms, new species were formed. After comparing the data to that of Example 14 (MPTES+Li in THF) and Example 15 it was concluded that the new peaks corresponded to $CH_2$—S—Li bonds formed when the organo-silane molecule now reduced to only containing 2 S atoms (i.e. TESPD) was split in two halves by two Li atoms.

44 hours after the start of the experiment, no significant changes were observed in the NMR spectrum. An additional amount of Li metal was then added such as to have the total molar ratio TESPT:Li=1:13. One week after the start of the experiment, the NMR spectrum showed decrease in the peaks corresponding to a molecule with only 2 sulphur atoms (~2.7 ppm) and a slight increase in the peaks corresponding to $CH_2$—S—Li bonds (~2.4 ppm).

Again, no evidence was found in the experiment that all of the S atoms were removed from the silane molecules and/or that the formation of $CH_2$—Li bond occurred. This was consistent with the previous visual and NMR experiments as done for Examples 14 and 15; hence it was concluded that 'internal' S atoms were all removed but the 'end points' that are bound to carbon were not. These remained as indicated by the $CH_2$—S—Li resonance.

This experiment showed that Li metal can react with the sulphur atoms in the TESPT molecules which leads to: 1) reducing the number of S atoms in the molecule and formation of Li-sulphides; 2) splitting the molecule in two parts, each ending with a $CH_2$—S—Li bond.

The initial coloration in the visual experiment of Example 16, indicative of polysulphides, is hypothesized to originate from silanes with sulphur bridges Sn (n>4) which are present in commercial TESPT as a minority component. From the above data, it is concluded that a sulphur bridge of length n in the organosilane allows the creation of polysulphides $Li_2S_m$ upon reaction with Lithium with m at most equal to n–2 as the end point sulphur atoms remain attached to the organosilane, as shown in the visual and NMR experiments of Examples 14 and 15. With an average value n=4 in TESPT, it can thus be concluded that longer polysulphides $Li_2S$ (m>2) are avoided which was one of the objects of the present invention.

Further it can be concluded that for an organosilane containing only 2 S atoms in the bridge (100% purity TESPD) no polysulphides are created as was the object of the present invention. For S bridges of small length, say 4 as in TESPT, still the long polysulphides ($Li_2Sn$, n>2) were not created, hence preventing the detrimental 'shuttle effect' mentioned by Manthiram et al.

Example 17

Visual

The solution of TESPT in THF-d8, in the presence of Na metal, initially was slightly yellow in color but within 10 min turned into dark orange, indicating a quick reaction between TESPT and Na, and the formation of polysulphides. For the next 1.5-2 hours the color became lighter orange and it stayed like that in the next 24 h. Precipitate also was observed at the bottom of the tube, indicative of the insoluble $Na_2S$. Two days after the start of the experiment, the color became lighter yellow and more precipitate was formed, which was indicative of the conversion of soluble polysulphides into the insoluble component $Na_2S$.

The analogy with the visual experiment of Example 16 was quite striking but just progressing faster, probably due to the higher reactivity of sodium.

NMR

The observations made in this experiments were quite similar to the NMR experiment of Example 16, the only difference being that lithium was replaced by sodium.

Figure 4:
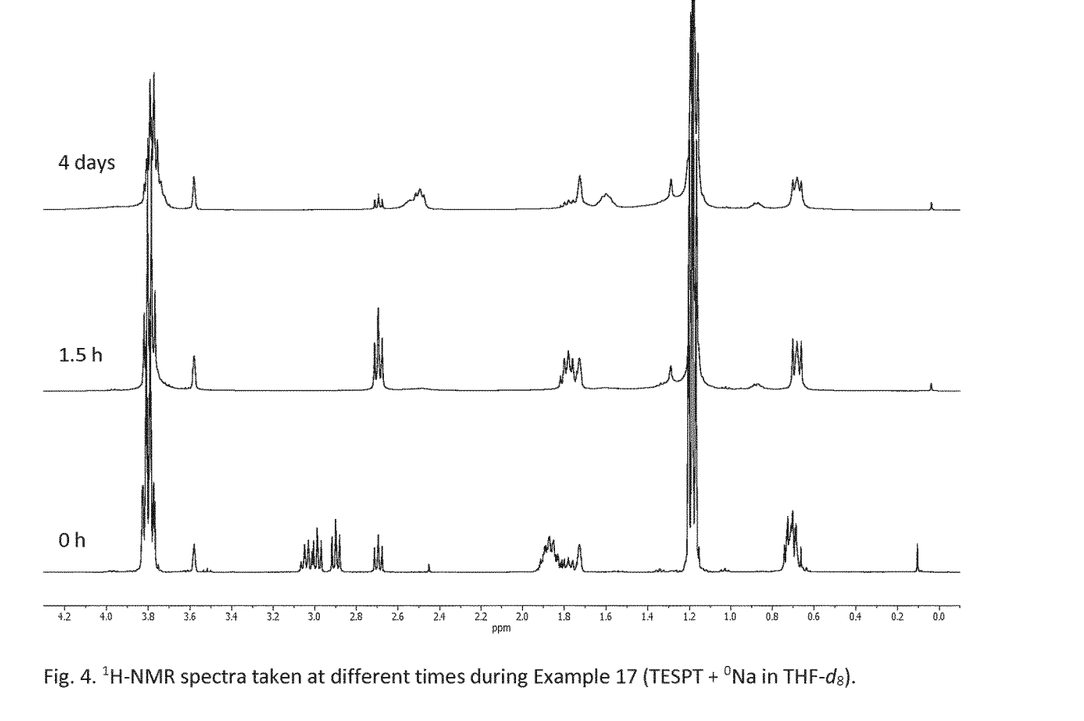
FIG. 4 shows $^1$H-NMR spectra according to an Example implementation of the disclosed subject matter.

The NMR spectrum taken 1.5 h after the start of the experiment showed complete disappearance of the peaks associated with 3 and more S atoms per molecule (2.9-3.1 ppm), and increasing peaks corresponding to 2 S atoms per molecule (2.7 ppm). This indicated that the molecules with 3 and more S atoms transformed into molecules with 2 S atoms, the removed S atoms being incorporated into Na-polysulphides.

In addition to this change, a new set of peaks became slightly visible, corresponding to the formation of $CH_2$—S—Na bonds (~2.5 ppm). This suggested that some of the molecules split in two parts, each having a $CH_2$—S—Na bond at the end. 4 days after the start of the experiment, the peaks corresponding to 2 S atoms per molecule (2.7 ppm) had strongly decreased, while the $CH_2$—S—Na peaks (~2.5 ppm) had become more pronounced, indicating that most of the molecules with 2 S atoms had split into 2 parts, each with a $CH_2$—S—Na bond.

Again, no evidence was found in the NMR spectra in this experiment that the S atoms next to $CH_2$-groups were removed from the TESPT molecule and/or that the formation of $CH_2$—Na bond occurred.

The initial coloration in the visual experiment of Example 17 being indicative of polysulphides, was hypothesized to originate from silanes with sulphur bridges Sn (n>4) which are present in commercial TESPT as a minority component.

From the above data, it was concluded that a sulphur bridge of length n in the organosilane allowed the creation of polysulphides $Na_2S_m$ upon reaction with sodium with m at most equal to n–2 as the end point sulphur atoms remained attached to the organosilane, as shown in the visual and NMR experiments of Examples 14 and 15. With an average value n=4 in TESPT, it can thus be concluded that longer polysulphides $Na_2S$ (m>2) were avoided, which was one of the objects of the present invention.

Similar conclusions about the prevention of the 'shuttle effect' and the avoidance of polysulfide creation can be expected for the sodium-sulphur battery as were made for the lithium-sulphur battery in the NMR experiment of Example 16.

Discussion

As can be seen from the Examples, the present invention surprisingly provides a new cathode material for use in for example lithium-sulphur batteries.

Examples 1-9, 12 and 13 show that by grafting a sulphur-containing organosilane compound onto aluminium (a typical material used as a current collector of an electrode) allows to create a film of sulphur-containing organosilane on the aluminium material.

The conductivity tests for Examples 10 and 11 showed that a good conductivity may be obtained for a grafted films consisting of organosilane and carbon black as conductivity improver.

Noteworthy is also the outcome of the cathodic activity tests in Examples 14-17, showing that no long polysulphides (that would be soluble in the electrolyte of e.g. a battery and would cause self-discharging of the battery) were formed.

The person skilled in the art will readily understand that many modifications may be made without departing from the scope of the invention.

That which is claimed is:

1. An electric energy storage device at least comprising:
   an anode comprising an alkali metal selected from lithium and sodium or a combination thereof;
   a cathode comprising a sulphur-containing organosilane compound or a mixture of sulphur-containing organosilane compounds grafted on the surface of the cathode; and
   an electrolyte placed between the anode and the cathode;
   wherein the cathode comprises a current collector surface that has been at least partly modified by grafting the sulphur-containing organosilane compound or a mixture of sulphur-containing organosilane compounds thereon.

2. The device according to claim 1, wherein the current collector comprises aluminium.

3. The device according to claim 1, wherein the cathode comprises one or more conductivity improvers.

4. The device according to claim 1, wherein the sulphur-containing organosilane compound has the general molecular formula (I):

(I)

wherein $R^1$, $R^2$ and $R^3$ are independently selected from $C_{1-12}$ alkoxy, acyloxy, aryloxy, alkyl, aryl, hydroxyl (OH) and halogen groups;

wherein $R^4$ is independently selected from a divalent hydrocarbon, preferably a $C_{1-18}$ alkylene or arylene;

wherein n is independently selected from an integer from 1 to 10;

wherein $R^5$ is selected from a divalent $C_{2-8}$ hydrocarbon, preferably alkylene or arylene; and wherein p is independently selected from an integer including zero (0).

5. The device according to claim 4, wherein $R^1$, $R^2$ and $R^3$ are independently selected from ethoxy and hydroxyl groups.

6. The device according to claim 4, wherein the sulphur-containing organosilane compound having the general molecular formula (I) is a bis(3-triethoxysilylpropyl)polysulphide.

7. A method for preparing a cathode comprising the steps of:
(a) selecting a cathode having a current collector surface;
(b) providing a sulphur-containing organosilane compound; and
(c) grafting the sulphur-containing organosilane compound on the current collector surface of the cathode thereby obtaining a cathode having an at least partly modified current collector surface.

8. The method according to claim 7, wherein the current collector comprises aluminium.

9. The method according to claim 7 wherein the sulphur-containing organosilane compound has the general molecular formula (I):

(I)

wherein $R^1$, $R^2$ and $R^3$ are independently selected from $C_{1-12}$ alkoxy, acyloxy, aryloxy, alkyl, aryl, hydroxyl (OH) and halogen groups;

wherein $R^4$ is independently selected from a divalent hydrocarbon, a $C_{1-18}$ alkylene or arylene;

wherein n is independently selected from an integer from 1 to 10;

wherein $R^5$ is selected from a divalent $C_{2-8}$ hydrocarbon, alkylene or arylene; and wherein p is independently selected from an integer including (0).

10. The method of claim 8, wherein $R^1$, $R^2$ and $R^3$ are independently selected from ethoxy and hydroxyl groups.

11. The method of claim 9, wherein the sulphur-containing organosilane compound having the general molecular formula (I) is a bis(3-triethoxysilylpropyl)polysulphide.

12. A cathode comprising:
a sulphur-containing organosilane compound or a mixture of sulphur-containing organosilane compounds grafted on the surface of the cathode; and
a current collector surface that has been at least partly modified by grafting the sulphur-containing organosilane compound or a mixture of sulphur-containing organosilane compounds thereon.

13. The cathode according to claim 12, wherein the current collector comprises aluminium.

14. The cathode according to claim 12 further comprising one or more conductivity improvers.

15. The cathode according to claim 14 wherein the one or more conductivity improvers is selected from the group consisting of metal particles, carbon particles or a combination thereof.

16. The cathode according to claim 12, wherein the sulphur-containing organosilane compound has the general molecular formula (I):

(I)

wherein $R^1$, $R^2$ and $R^3$ are independently selected from $C_{1-12}$ alkoxy, acyloxy, aryloxy, alkyl, aryl, hydroxyl (OH) and halogen groups;

wherein $R^4$ is independently selected from a divalent hydrocarbon, preferably a $C_{1-18}$ alkylene or arylene;

wherein n is independently selected from an integer from 1 to 10;

wherein $R^5$ is selected from a divalent $C_{2-8}$ hydrocarbon, preferably alkylene or arylene; and wherein p is independently selected from an integer including zero (0).

17. The cathode according to claim 16, wherein $R^1$, $R^2$ and $R^3$ are independently selected from ethoxy and hydroxyl groups.

18. The cathode according to claim 16, wherein the sulphur-containing organosilane compound having the general molecular formula (I) is a bis(3-triethoxysilylpropyl)polysulphide.

* * * * *

UNITED STATES PATENT AND TRADEMARK OFFICE
CERTIFICATE OF CORRECTION

PATENT NO. : 11,329,291 B2
APPLICATION NO. : 16/633425
DATED : May 10, 2022
INVENTOR(S) : Guy Lode Magda Maria Verbist et al.

It is certified that error appears in the above-identified patent and that said Letters Patent is hereby corrected as shown below:

In the Specification

In Column 7, Line 22, delete "Snalysis" and insert -- Analysis --.

In Column 9, Line 66, delete "CH2-S—Li" and insert -- $CH_2$—S—Li --.

In the Claims

In Column 12, Line 48, in Claim 1, delete "device" and insert -- device, --.

In Column 14, Line 4, in Claim 9, delete "(0)." and insert -- zero (0). --.

Signed and Sealed this
Second Day of August, 2022

*Katherine Kelly Vidal*
Katherine Kelly Vidal
*Director of the United States Patent and Trademark Office*